J. H. WAGENHORST.
TIRE SHOE AND RIM THEREFOR.
APPLICATION FILED FEB. 17, 1917.
1,335,411.
Patented Mar. 30, 1920.
2 SHEETS—SHEET 1.
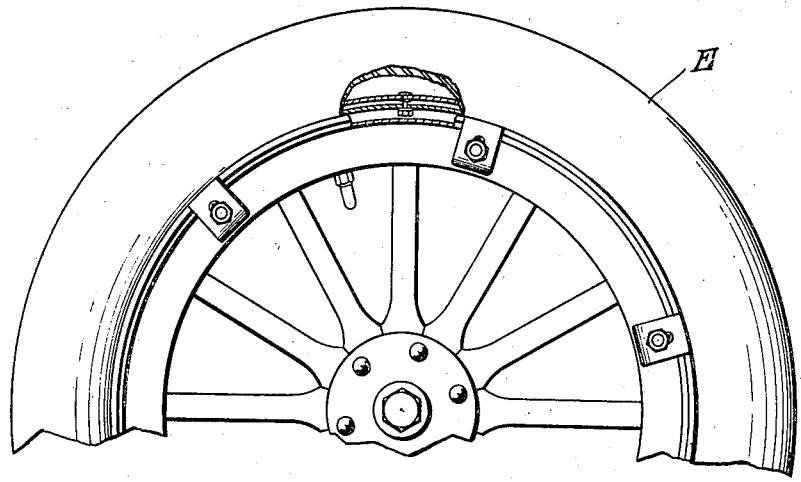
Fig-1
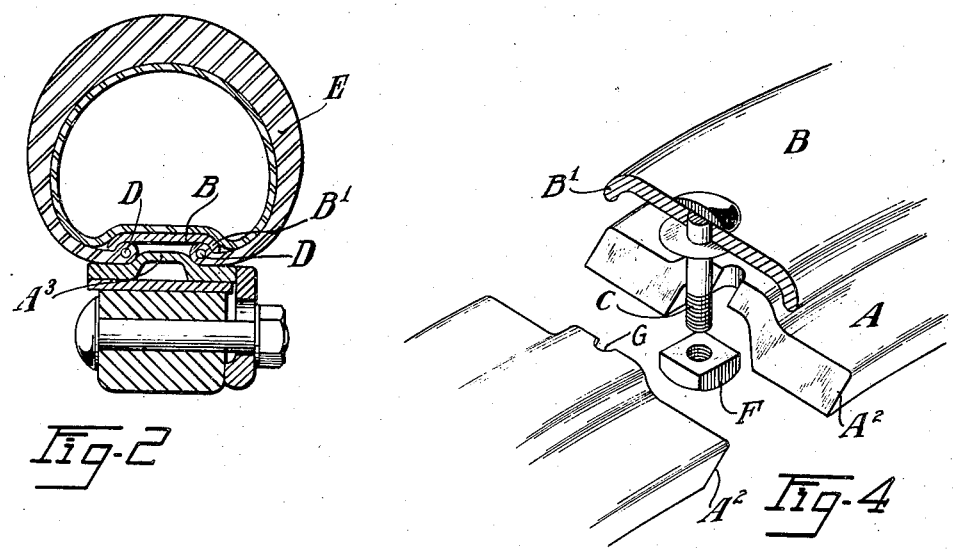
Fig-2
Fig-4
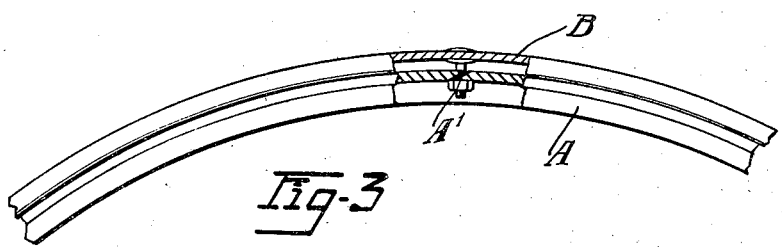
Fig-3
Inventor
J. H. Wagenhorst
By Hull Smith Brock & West
Attys.

J. H. WAGENHORST.
TIRE SHOE AND RIM THEREFOR.
APPLICATION FILED FEB. 17, 1917.
1,335,411.
Patented Mar. 30, 1920.
2 SHEETS—SHEET 2.
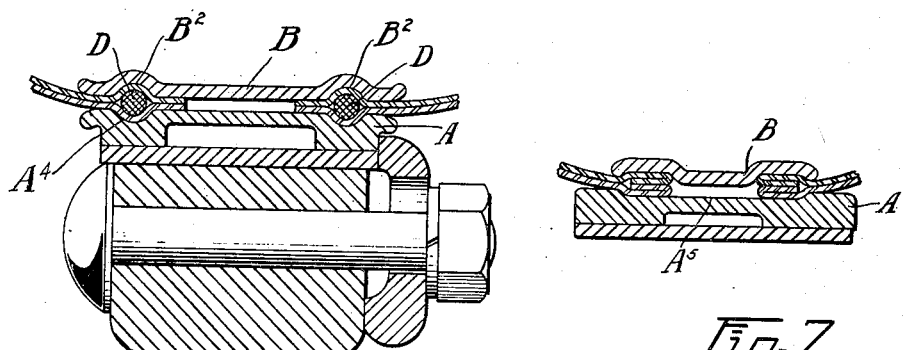
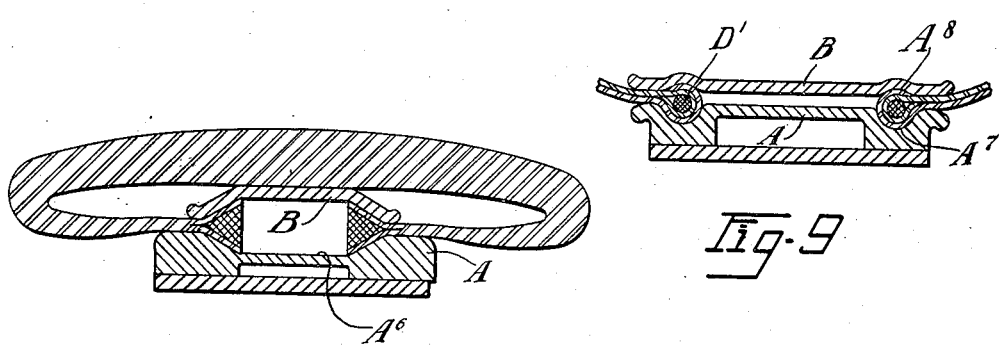
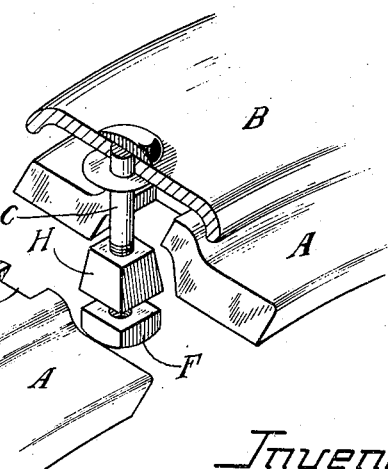
Inventor
J. H. Wagenhorst
By Hull Smith Brock & West
Attys.

UNITED STATES PATENT OFFICE.

JAMES H. WAGENHORST, OF AKRON, OHIO.

TIRE-SHOE AND RIM THEREFOR.

1,335,411.  Specification of Letters Patent.  Patented Mar. 30, 1920.

Application filed February 17, 1917. Serial No. 149,243.

*To all whom it may concern:*

Be it known that I, JAMES H. WAGENHORST, a citizen of the United States, residing at Akron, in the county of Summit and State of Ohio, have invented a certain new and useful Improvement in Tire-Shoes and Rims Therefor, of which the following is a full, clear, and exact description, reference being had to the accompanying drawings.
This invention is a novel construction of tire, and demountable rim therefor and which are particularly adapted for use upon automobile wheels and capable of carrying an inflated tire either upon a wheel body or demounted therefrom.

At present, tire carrying rims are of the clencher or straight side type, in which the beads of the tire shoe are held against the rim flanges by the air pressure within the pneumatic tire.

These types of tire carrying rims have certain objectionable features. The straight side type of rim is used in connection with a tire shoe having an inextensible bead which is expensive to manufacture on account of the difficulties encountered in molding; and the clencher type, while suited for small sized wheels is not particularly adapted for larger sized wheels unless used in connection with Q-D rings, and demountable tire carrying rims having Q-D rings are objectionable on account of the extra amount of metal required adding to both the cost of production and the weight of the completed article.

Both types of rims now in use are objectionable in case the tire becomes deflated and one is compelled to travel for any distance upon said deflated tire, as the shoe is bent at a sharp angle over the rim flanges which quickly cut through and destroy the shoe.

The object of my invention, therefore, is to provide a novel construction of tire and demountable rim therefor which will answer every purpose of the present type of rims and which shall be lighter than the rims now in use, one which can be used in connection with either soft extensible or inextensible beads and one which will be devoid of side flanges so that in case of deflation the shoe and tire will not be subjected to the grinding or cutting operation of sharp edges but will have smooth band-like surfaces for support thereby avoiding the grinding or cutting operations incidental to the present types of tire carrying rims, Another object of my invention is to provide a demountable tire carrying rim in which the edges of the tire shoe will be brought together in substantially horizontal alinement and thereby permit the side portions of the shoe to yield without producing a bend at the rim edge, as it is well understood that owing to the manner of connecting the tire shoe with a flanged rim said shoe in yielding must necessarily bend or angle to a large extent at the edge of said rim flange and this bending or angling of the shoe is more or less detrimental to the shoe at these points.

With these objects in view and certain others which will become apparent as the description proceeds my invention consists in the novel features of construction and combination hereinafter fully described and pointed out in the claims.

In the drawings forming a part of this specification Figure 1 is a view showing a portion of an automobile wheel with tire carrying rim, constructed in accordance with my invention, applied thereto; Fig. 2 is a transverse sectional view of the same; Fig. 3 is a longitudinal sectional view of a portion of the tire carrying rim; Fig. 4 is a detail perspective view illustrating the means for connecting the parts of the rim; Fig. 5 is a detail perspective view showing a slightly modified form of rim and connection; and Figs. 6, 7, 8 and 9 are transverse sectional views showing various types of rims and shoes.

Broadly speaking my invention comprises a demountable tire carrying rim A, a band B and a connection C between said tire carrying rim and band. The tire carrying rim A is a rolled sheet metal rim of suitable width and thickness transplit at A' the end being beveled as most clearly shown at A².
The inner or wheel face of the tire carrying rim A is shaped in any suitable or desirable manner according to the felly band and rim fastening means to be employed in connection therewith.
The beads D of the tire shoe E are adapted to rest upon the outer or tire face of the tire carrying rim A and this outer face may be perfectly straight with a central raised portion A³ as shown in Fig. 2, or said outer face may have circumferential grooves A⁴ as shown in Fig. 6, or the central portion of the outer face of rim may be slightly depressed as shown at A⁵ in Fig. 7, considerably depressed with beveled edges as shown at A⁶ in Fig. 8 and in Fig. 9 the circumferential grooves A⁷ are of greater depth than the grooves A⁴ in order to receive and hold inextensible beads as hereinafter explained. The beads of the shoe are arranged upon the tire carrying rim substantial in alinement with each other the contiguous portions of the shoe extending out as shown.

The band B which is continuous and inextensible is arranged within the shoe and is shaped to engage the beads of the tire shoe. In Fig. 2 the band B is shown of less width than the tire carrying rim A and the edges B' are turned inwardly in order to engage said beads. In the construction shown in Fig. 6 the band B is substantially the same width as the tire carrying rim A and it is formed with grooves B² which mate with the grooves A⁴ of the rim and receive the bead D of the tire shoe therebetween, and the same is true of the construction shown in Fig. 7 while in Fig. 8 the band is very similar to that shown in Fig. 2.

The engaging faces of the rim and band will be shaped according to the character of the tire beads as most clearly indicated in the various figures of the drawings. In the constructions shown in Figs. 2, 6, 7 and 8 the beads are soft and extensible. Tire shoes with soft and extensible beads are to be preferred because less expensive to manufacture and equally as efficient in operation.

The continuous and inextensible band B is arranged within the tire shoe, and said tire shoe and band are then placed upon the demountable tire carrying rim, which has been contracted to facilitate the placing operation. This rim is then expanded so as to bind the beads securely against the inextensible continuous band.

To accomplish this expansion the tire carrying rim is transplit and provided with beveled edges and any suitable means for causing such expansion may be employed. As one simple and efficient means for accomplishing this expansion I have shown a bolt C rigidly attached to the band B and passing through the tire carrying rim A the ends of the rim being notched as shown at G and a nut F is screwed upon the threaded end of the bolt, drawing the rim and band close together and simultaneously expanding the tire carrying rim against the beads of the shoe. In Fig. 5 I have shown the ends of the rim not only beveled but also provided with rectangular shaped notches G, and positioned in said notches is the wedge block H carried upon the bolt C and forced into engagement with the ends of the rim by means of the nut F.

As previously stated tire shoes with extensible beads are to be preferred but it will be understood that rims embodying my improvement can be used in connection with tire shoes having inextensible beads and in Fig. 9 I have shown such a construction of rim, the circumferential grooves A⁷ being of considerable depth and the grooves A⁸ in the band B being mere depressions so that the inextensible beads D' can be readily slipped under the edges of the rim B and seated in the grooves A⁷.

The tire carrying rim A being transplit can be easily contracted when the locking connection is released, thereby permitting the tire shoe to be quickly and easily removed from the rim.

The outer edges of the rim being flat and the beads of the tire being made to approach each other in substantially horizontal alinement the tire will be essentially circular in shape when fully inflated and sustaining its load under normal conditions, and when unusual strain is placed thereon, as when encountering an unyielding object, the tire as a whole will yield without bending or angling the tire shoe adjacent the bead as now occurs with tires used in connection with rims having side flanges either of the clencher or straight side type. Having a tire carrying rim devoid of flanges is therefore a decided advantage.

Furthermore should the tire connected to a rim as herein shown and described become deflated it is obvious that traveling upon the flat portions of the band and rim (as shown in Fig. 8) would not be particularly injurious to the tire as are the rim flanges of the tire carrying rims now in use. It will thus be seen that I provide a novel construction of tire carrying rim capable of carrying out all of the advantageous objects hereinbefore set forth.

Having thus described my invention what I claim is:—

1. The combination with a demountable tire carrying rim devoid of flanges and having circumferential bead receiving grooves, of a band encircling said rim and having mating bead receiving grooves, a tire shoe having beads adapted to fit between said rim and band and rest in said grooves together with means for securing said rim and band in contact with said beads.

2. The combination with a tire carrying rim devoid of flanges, of a tire having terminal seating parts, a continuous inextensible band arranged within said tire, said rim and band having mating surfaces adapted to engage said terminal seating parts and means for locking said parts in engagement.

In testimony whereof, I hereunto affix my signature.

JAMES H. WAGENHORST.